M. HAIMOWITZ.
WINDOW FRAME FOR AUTOMOBILE TOPS.
APPLICATION FILED OCT. 1, 1920.
1,412,282.
Patented Apr. 11, 1922.
2 SHEETS—SHEET 1.
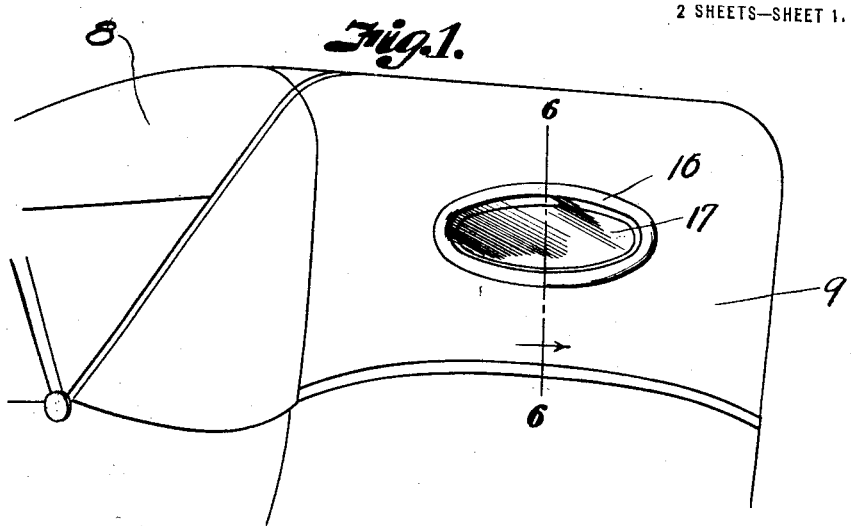
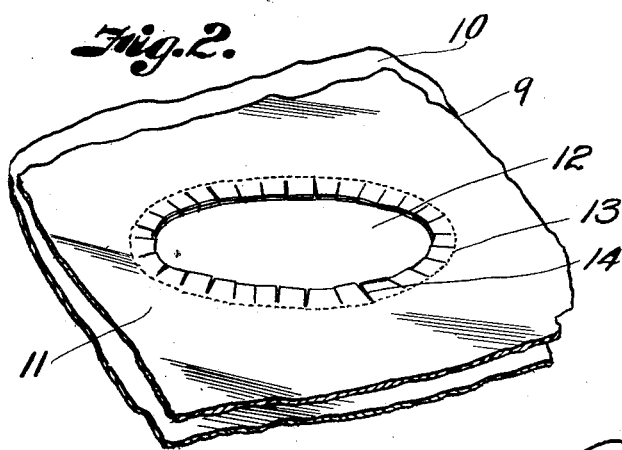
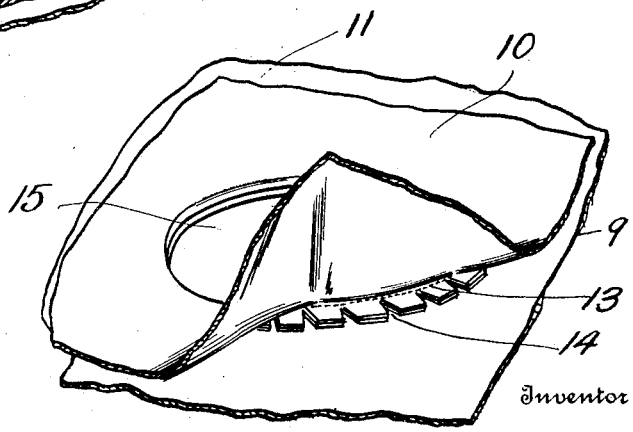
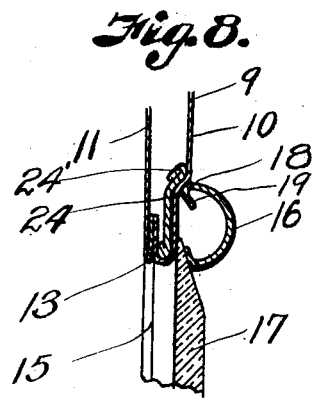
Inventor
Morris Haimowitz
By Arthur E. Brown
Attorney

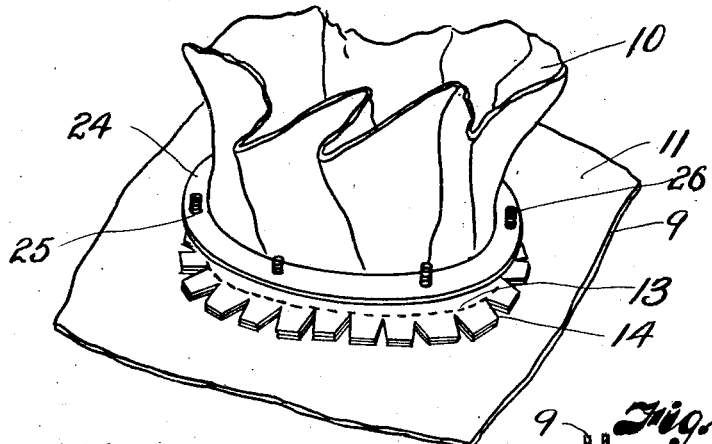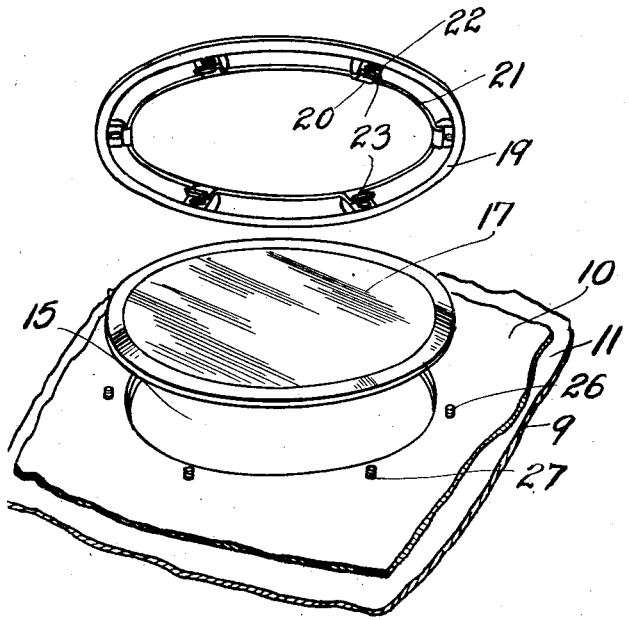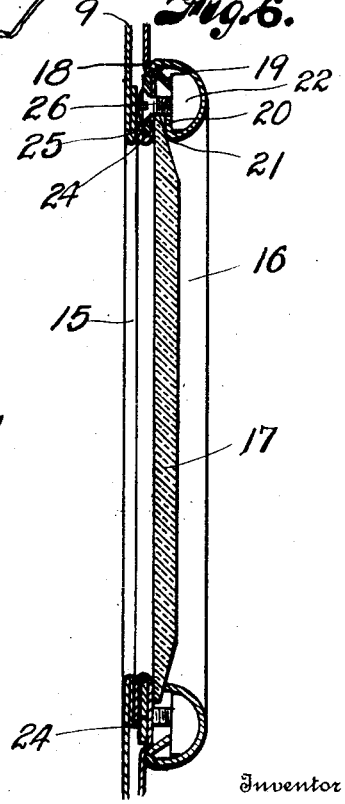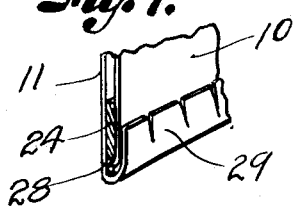

UNITED STATES PATENT OFFICE.

MORRIS HAIMOWITZ, OF KANSAS CITY, MISSOURI.

WINDOW FRAME FOR AUTOMOBILE TOPS.

1,412,282. Specification of Letters Patent. Patented Apr. 11, 1922.

Application filed October 1, 1920. Serial No. 414,020.

*To all whom it may concern:*

Be it known that I, MORRIS HAIMOWITZ, a subject of the King of Rumania, residing at Kansas City, in the county of Jackson and State of Missouri, United States of America, have invented certain new and useful Improvements in Window Frames for Automobile Tops; and I do declare the following to be a full, clear, and exact description of the invention, such will enable others skilled in the art to which it appertains to make and use the same, reference being had to the accompanying drawings, and to the letters and figures of reference marked thereon, which form a part of this specification.

My invention relates to means for securing window lights in fabrics and it is particularly adapted for fastening the plate glass windows in automobile tops, top curtains and the like.

The principal object of my invention is to provide an efficient and inexpensively constructed window frame so constructed as to prevent sagging and tearing of the fabric to which the window is applied, due to the weight and constant vibration of the glass.

Another object is to provide a frame where all screws and unsightly fastening means, such as suspension straps and the like are eliminated or covered from sight. Another object is to provide a frame that will not crack or break the glass because of uneven tension on the glass by the frame; and further, to provide a frame that will effectively prevent leakage of rain and the other elements to the inside of the curtain.

In the drawings;

Fig. 1 is a perspective view of an automobile top provided with a rear curtain to which my invention is applied.

Fig. 2 is a fragmentary view showing the method by which the two pieces of fabric that form the rear curtain are secured together at the window opening.

Fig. 3 is a similar view showing the curtain after it has been turned to bring the seam between the two fabrics.

Fig. 4 is a view illustrating the method by which the anchoring ring is applied.

Fig. 5 is a disassociated view of the outer frame plate glass, and rear curtain.

Fig. 6 is a sectional view on the line 6—6 of Fig. 1.

Fig. 7 is a sectional view of a slightly modified form of finishing of the curtain opening, and Fig. 8 is a detail view showing a modified form of anchoring ring.

Referring more in detail to the drawings by numerals of reference:

8 designates an automobile top provided with a rear curtain 9 to which my invention is applied. The rear curtain is, in the manufacture of the top, formed separately from the top proper, and composed of the layers 10 and 11 of fabric, having registering window openings 12, about which the layers are stitched together, by a line of stitching 13 spaced from the edge of the opening to form loose margin lips. These margin lips are slit, as at 14, and the layer 10 is then drawn through the opening (Fig. 4), so that, from having constituted the outer layer, it now constitutes the inner layer, and the serrated margin lips which originally extended into the opening (Fig. 2) are extended outwardly therefrom and concealed between the two layers of material (Fig. 3), thereby presenting a finished edge to the opening, and it is to such finished opening that I hereafter refer.

The outer frame 16 and the opening 15 may be of any shape desired, but in the present instance I have illustrated them as elliptical in form. The outer frame 16 is constructed of metal and is of greater diameter than the opening 15 so as to overlie the opening 15 to clamp the glass 17 against the curtain 9, as presently described.

The frame 16 is substantially semi-circular in cross section, as shown in Fig. 6, and the outer periphery of the frame is inbent as shown at 18, forming a flange 19 which bears against the curtain 9, thus preventing the sharp edge of the frame from cutting the fabric and providing an efficient gripping surface for the frame. Located at intervals about the inner part of the frame and secured in place by the flange 19 and inbent projections 20 extending from the inner periphery 21 of the frame, are nuts 22 by which the frame is held in place.

Certain of the inbent projections 20 are provided with right angle bends 23, which overlie the edge of the glass 17 and hold the glass in position in the frame.

To clamp the frame and glass to the curtain, I provide an anchoring ring 24, having openings 25 through which bolts 26 are projected to engage the nuts 22. The anchoring ring 24 is of smaller diameter than the frame 16 so that when the bolts 26 are tightened the curtain is drawn slightly within the frame 16, as shown in Fig. 6, to tighten the fabric about the frame and effectively seal the connection between the frame and curtain 9. The inner diameter of the ring 24 is approximately the same diameter as the opening in the frame so as to clamp the glass therebetween. Since this anchoring ring encircles the window opening and is entirely enclosed by the curtain and held in place by the stitching 13, it is readily seen that all stretching of the window opening is eliminated and the curtain cannot pull away from the window frame.

In assembling the window, the curtain is constructed as described and the anchoring ring is then slipped over the layer 10, as shown in Fig. 4; openings 27 are then made in the fabric 10 and the screws 26 inserted. The glass 17 is then placed in the frame within the projections 23 and against the curtain opening 15 and the bolts are screwed into the nuts 22 to clamp the parts together, after which the layer 11 is smoothed down over the anchoring ring 24. The layers 10 and 11 are then cut to fit the back of the automobile top and secured thereto in any well known manner.

To prevent wear to the fabric by the ring 24, the ring may be covered with felt or other material, but I have found that this is necessary only in the cheaper grades of fabric.

If more than one window is to be placed in the curtain, it would be impossible to turn the curtain as heretofore described, and in this case the anchoring ring is placed between the layers 10 and 11 and the layers are sewed together by a line of stitching 28 within the inner periphery of the ring. The edge 29 is then slit at intervals as before and turned back upon the outside of the curtain to be clamped between the glass 17 and ring 24 as shown in Fig. 7. Otherwise, the window is identical to that previously described.

Since a portion of the fabric is clamped between the ring and the glass, a cushion is provided for the glass to bear against, preventing breakage of the glass by uneven tension of the screws or bolts and also preventing rattling of the glass in the frame.

In Fig. 8 I show an anchoring ring 24 of greater diameter than the outer frame, having an outwardly bent flange 24' so that when the frame and ring are brought together the curtain is drawn inwardly at the flange 24' to stretch the curtain and effect a seal as in the former instance. With this form the glass is drawn into approximately the same plane as the curtain.

What I claim and desire to secure by Letters-Patent is:

1. In a curtain comprising a double layer of material, having a window opening, the margins of the two layers being turned back to lie between the layers, a panel of transparent material covering the opening with its edge overlying one of the layers, a retaining frame surrounding the opening and engaging the panel, a ring located between the layers, and keeper members carried by the frame and ring and holding the window members in place.

2. In a curtain comprising two layers of material, having registering window openings and stitched together adjacent the openings, the layers being reversed after stitching to contain the margin between the layers, a retaining frame surrounding the opening, a panel of transparent material covering the opening with its edge interposed between the outer curtain layer and one edge of the frame, nuts carried by said frame, a ring surrounding the opening and engaging the inner face of said outer layer, and screws extending through the ring and outer layer and engaging said nuts, binding the outer layer against the retaining frame and against the transparent panel.

In testimony whereof I affix my signature.

MORRIS HAIMOWITZ.